United States Patent
Venas et al.

(12)

(10) Patent No.: US 10,474,592 B2
(45) Date of Patent: Nov. 12, 2019

(54) CONTROL OF SEMICONDUCTOR DEVICES

(71) Applicant: Nordic Semiconductor ASA, Trondheim (NO)

(72) Inventors: Arne W Venas, Trondheim (NO); Ragnar Haugen, Skien (NO)

(73) Assignee: NORDIC SEMICONDUCTOR ASA, Trondheim (NO)

(*) Notice: Subject to any disclaimer, the term of this patent is extended or adjusted under 35 U.S.C. 154(b) by 465 days.

(21) Appl. No.: 14/410,882

(22) PCT Filed: Jun. 19, 2013

(86) PCT No.: PCT/GB2013/051597
§ 371 (c)(1),
(2) Date: Dec. 23, 2014

(87) PCT Pub. No.: WO2014/001763
PCT Pub. Date: Jan. 3, 2014

(65) Prior Publication Data
US 2015/0193357 A1 Jul. 9, 2015

(30) Foreign Application Priority Data
Jun. 26, 2012 (GB) .................................. 1211340.3

(51) Int. Cl.
*G06F 13/24* (2006.01)
*G06F 13/12* (2006.01)
(Continued)

(52) U.S. Cl.
CPC .............. *G06F 13/124* (2013.01); *G06F 1/10* (2013.01); *G06F 1/3287* (2013.01);
(Continued)

(58) Field of Classification Search
None
See application file for complete search history.

(56) References Cited

U.S. PATENT DOCUMENTS

| 9,317,639 B1* | 4/2016 | Jain .................... G06F 17/5031 |
| 2003/0172310 A1* | 9/2003 | Moyer .................. G06F 1/3203 713/300 |

(Continued)

FOREIGN PATENT DOCUMENTS

| JP | H08152945 | 6/1996 |
| JP | 2005250650 A | 9/2005 |

(Continued)

OTHER PUBLICATIONS

International Preliminary Report on Patentability from corresponding Appl.No. PCT/GE2013/051597, dated Jan. 8, 2015.
(Continued)

*Primary Examiner* — Henry Tsai
*Assistant Examiner* — Aurangzeb Hassan
(74) *Attorney, Agent, or Firm* — Ferguson Case Orr Paterson, LLP

(57) ABSTRACT

A microcontroller device comprises at least one processor (8), one or more peripheral systems (6) and a resource supply module (2). The processor (8) and peripheral system(s) (6) are each arranged to generate a signal when they require power and/or a clock signal. These signals stimulate the resource supply module (2) to supply the requested resource.

21 Claims, 8 Drawing Sheets

(51) Int. Cl.
   *G06F 1/3287*   (2019.01)
   *G06F 1/10*   (2006.01)
   *G06F 13/42*   (2006.01)

(52) U.S. Cl.
   CPC ........ *G06F 13/4221* (2013.01); *Y02D 10/151* (2018.01); *Y02D 10/171* (2018.01); *Y02D 50/20* (2018.01)

(56) References Cited

U.S. PATENT DOCUMENTS

| | | |
|---|---|---|
| 2004/0193929 A1 | 9/2004 | Kuranuki |
| 2005/0136989 A1 | 6/2005 | Dove |
| 2005/0198418 A1 | 9/2005 | Hoshi et al. |
| 2006/0270436 A1* | 11/2006 | Amano ............ H04W 52/0245 455/522 |
| 2008/0010391 A1* | 1/2008 | Moriya ................ G06F 13/362 710/110 |
| 2008/0068239 A1* | 3/2008 | Anderson ............ G06F 1/3203 341/139 |
| 2008/0071879 A1* | 3/2008 | Park ..................... G06F 11/141 709/208 |
| 2010/0229011 A1 | 9/2010 | Pedersen et al. |
| 2010/0313041 A1* | 12/2010 | Suzuki ................ G06F 1/3287 713/300 |
| 2011/0161683 A1 | 6/2011 | Zou et al. |
| 2011/0208987 A1* | 8/2011 | Fujigaya ............. G06F 1/3237 713/323 |
| 2011/0264901 A1 | 10/2011 | Madar et al. |
| 2011/0276812 A1 | 11/2011 | Lee et al. |
| 2012/0047376 A1* | 2/2012 | Nakajima ............ G06F 1/3237 713/310 |

FOREIGN PATENT DOCUMENTS

| | | |
|---|---|---|
| JP | 2011238231 A | 11/2011 |
| WO | WO 2006088167 | 8/2006 |

OTHER PUBLICATIONS

International Search Report for PCT/GB2013/0515, dated Oct. 2, 2013.

Notice of Reasons for Refusal from Japanese Patent Appl. No. 2015-519325. dated Mar. 28, 2017.

International Search Report for Application No. GB1211340.3; dated Nov. 16, 2012.

\* cited by examiner

CONTROL OF SEMICONDUCTOR DEVICES

This invention relates to semiconductor devices, in particular it relates to the control of the use of system resources by subsystems to make efficient use of power overall across the device.

As semiconductor devices, such as microcontrollers, become more complex with more peripheral systems (here the term "peripheral" is intended to mean peripheral to the main processor but typically still part of the same piece of silicon), the importance of maintaining effective control of power consumption also increases in order to extend battery life in mobile devices. However the complexity also makes such control more difficult.

In existing devices control over resources supplied to peripherals, such as power and clock signals is controlled centrally using a 'top-down' approach. However the Applicant has appreciated that this does not provide the maximum efficiency as the central resource controller needs to be able to have an overview of the requirements of the peripherals. To avoid denying power and/or a suitable clock signal to a particular peripheral and thus causing a malfunction, resources tend to be supplied more than is theoretically necessary. The Applicant has also appreciated that with this arrangement it is necessary to rewrite the code which controls resources every time a peripheral is added/activated or removed/deactivated.

When viewed from a first aspect the present invention provides a microcontroller device comprising at least one processor, one or more peripheral systems and a resource supply module wherein the processor and peripheral system(s) are each arranged to generate a signal when they require power and/or a clock signal and wherein said signals stimulate the resource supply module to supply the requested resource.

Thus it will be seen by to those skilled in the art that in accordance with the invention, rather than resources being managed by a 'top-down' approach, resources are allocated to peripherals on demand. Control over resource allocation is therefore distributed down to the peripherals rather than being fully centrally managed. This change of approach recognises that only the peripherals themselves have a detailed knowledge of when different resources are required and how the requests for these can be managed in a way which seeks to minimise power consumption. Moreover by distributing control over resource allocation down to the peripherals, it is not, at least in preferred embodiments of the invention, necessary to rewrite the code for the power management if a peripheral is added or removed.

The peripherals may be arranged to send resource request signals directly to the resource supply module but in a set of embodiments the peripherals are arranged to communicate with an intermediate master module which receives said request signals and sends an appropriate request to the resource supply module. In such an arrangement a peripheral will be associated with a slave module for handling the resource request. There may be one slave module per peripheral or a peripheral may have more than one slave module—e.g. if different parts of the peripheral have different power and/or clock requirements. It is also envisaged that multiple peripherals could share one slave module if they have common power/clock requirements, although in general this does not allow full advantage to be taken of the optimised power savings which can be achieved in some embodiments of the invention.

In a set of embodiments each master module is connected to a plurality of slave modules. This allows the master module to coordinate the requests from the associated slaves. For example if one or more of the slaves requests a particular clock signal, the master module may issue an appropriate request to the resource supply module to supply the clock signal. On the power side, although requests from the individual modules may each be below the threshold for a higher power regulator to be enabled, the cumulative requirements off all the slaves connected to a particular master module may be greater than such a threshold, meaning that the master can issue a request to the resource supply module to enable the higher power module. This will be the case even if no individual peripheral requested the higher power regulator (where that feature is provided). In a set of embodiments where there is a single master module connected directly to the resource supply module ('top master'), said master module is arranged to determine automatically which of a plurality of power regulators is to be used. This allows the 'top master' to aggregate the power requests from all modules (optionally including the resource supply module itself) and to use this to determine the overall level of power required. The top master could determine the amount of power required by individual modules from data included with the power requests therefrom, and/or it could use pre-stored information—e.g. in a look-up table, In a set of embodiments the master module comprises a gate (hereinafter "clock gate") for each slave module to which it is connected to allow the selective passage of a clock signal to the respective slave module. In a subset of such embodiments the master module is arranged, on receipt of a request for a clock signal, to ensure that the appropriate clock source is stable and running before opening the clock gate to the slave module which made the request. This helps to ensure that the clock signal is supplied in a controlled way, without unwanted artefacts. Where the requested clock, or another, more accurate clock (which would in general otherwise be more costly in terms of power to provide) is already being provided to another slave module, the master module does not need to wait but may open the appropriate clock gate immediately. In this circumstance the master module is arranged, in a set of embodiments, still to issue a request to the resource supply module in case the requested clock signal is required by the second slave after the requirement from the original slave (which caused the clock to be running when the second slave requested it) has ended.

A single master module could be provided to service all slaves. However this is not essential and in a set of embodiments at least two master modules are provided. Where multiple master modules are provided, preferably only a single master module is connected to the resource supply module with one or more further master modules connected to it. In general master modules may be connected to other master modules, thus giving a flexible system topography. Where a master module is connected to another master module it is preferred that it has a direct through connection to the upstream output of the master—i.e. the connections does not pass through a clock gate. This allows the advantageous situation whereby any connection between a peripheral and the resource supply module passes through only one clock gate, thereby avoiding additional latency.

The resource request signals may comprise just a request for power or just a request for a particular clock signal, but in a set of embodiments they comprise both. In a set of embodiments the request for power includes the level of power required. This may indicate whether a higher power regulator is required in order to meet that particular peripheral's demands.

In a set of embodiments the request for a clock signal indicates the quality, or minimum quality, of clock that is required. The quality of a clock may be a function of one or more of its accuracy, start-up time or power consumption. In addition to being able to request a clock signal, a peripheral may be able to make more sophisticated requests regarding the clock resource. For example in a set of embodiments a peripheral can request that a particular clock source is to be turned on. This will actually power up the respective oscillator which tends to have an associated start-up delay (the length of which depends on the type of clock source). By allowing a peripheral to request that the clock core be turned on, the peripheral can, in some circumstances make the request slightly ahead of when the clock signal will be needed, or can predict when it will need the clock signal again, to compensate for the start-up delay.

Additionally or alternatively a peripheral may request that a clock buffer is to be turned on. This is a necessary step in allowing a clock signal actually to be provided by some types of clock source. Flexibility in allowing a peripheral to turn the clock buffer on or off separately from the clock core is advantageous as it offers the possibility of reducing power whilst minimising start-up delay since the buffer will typically consume most power while running but the core will typically take longer to power up. Thus the flexibility given in accordance with the embodiments set out above allows a peripheral to switch off the buffer but leave the core running if it will need the clock signal again within a reasonably short time.

In set of embodiments the device comprises a plurality of predetermined options which the slave modules are able to select for determining to what extent resources are made available to the slave module. The Applicant has appreciated that by presenting a certain number of pre-defined options— referred to hereinafter as 'penalty levels'—to peripherals that offer differing trade-offs between latency and power consumption, the peripherals can much more closely tailor their power consumption to their specific requirements which allows for more efficient use of power than globally imposed regimes which inevitably involve using more power than is strictly necessary in order to meet latency requirements for example. In a subset of such embodiments the predetermined options comprise differing latencies and differing power consumptions.

It may be seen therefore that the peripherals can have various states which give different trade-offs between power consumption and latency. These are referred to as "penalty levels" as they indicate the penalty in terms of latency that a peripheral is prepared to accept in the interest of reducing power (whilst always of course being consistent with meeting its operational specifications). To give an example based on the options mentioned above regarding the clock source and the clock buffer, the maximum penalty level is where the peripheral makes no requests either for power or clock. This will in general give rise to the longest latency before the peripheral is able to be fully operative but of course it is not associated with any significant power consumption.

The next penalty level is represented by the state in which the peripheral requests power but no clock. This will give it a shorter latency before it can be fully operational but clearly at the expense of some increase in power consumption.

The third penalty level corresponds to the peripheral requesting power and the clock source to be running. This gives a significant reduction in latency since starting the clock source core tends to take a relatively long time to start up as mentioned earlier. However having the clock source running has implications for the overall power consumption.

The fourth penalty level is the 'zero' penalty level where the peripheral requests power, clock source and clock buffer to be running. This allows it to receive a clock signal as soon as the corresponding clock gate is closed—i.e. with no significant delay.

The penalty levels set out above can therefore be seen as differing standby states in which a clock signal is not being requested but which give more refinement over the trade-off between power consumption and latency.

This is a further illustration of the principle, enabled by the invention, of devolving control of resources to peripherals which are then able to take more refined decisions about their requirements and so reduce overall power consumption without unacceptably comprising operation or latency. In the prior art central control arrangements, it would be very difficult to manage the penalty levels of the individual peripherals as this would have to be hard-coded into the controller function and this would not be scalable as peripherals were added or their operation altered.

The penalty level for a given peripheral at a given point of time will be determined by the maximum latency which it is able to tolerate at that time. Of course if the clock source or buffer is already running for another peripheral the actual latency experienced will be shorter than this maximum.

It will be appreciated that the penalty levels set out above are merely illustrative examples derived from the clock states described. If more or different clock and/or power states are available then more or different penalty levels may be available. It is not however essential that penalty levels corresponding to all possible combinations of states are made available to peripherals; there may for example be some that do not make sense (e.g. ones that increase power consumption without decreasing latency or vice versa).

As described above the invention allows peripherals to request resources as they require them under the principle that the peripherals are best placed to know exactly what resources they require and so can enable the resources to be requested as efficiently as possible. The Applicant has further appreciated however that there are some circumstances in which a first peripheral knows that resources will be required by a second peripheral to carry out an operation in accordance with a request from the first peripheral. In a set of embodiments of the invention therefore at least one first peripheral is arranged to stimulate a second peripheral to issue a resource request. In such embodiments latency may be reduced compared to the situation in which the second peripheral receives a request from the first peripheral to carry out an operation but the second peripheral must then request the necessary resources before it carry out the operation.

Such an arrangement is considered to be novel and inventive in its own right and thus when viewed from a further aspect the invention provides a microcontroller device comprising a plurality of peripheral modules and a resource supply module wherein at least a first one of the peripheral modules is programmed to carry out a task involving a second one of the peripheral modules, said first peripheral module being arranged to generate a signal to stimulate the second module to generate a signal requesting power and/or a clock signal from the resource supply module.

The peripheral modules may comprise a processor. The first peripheral module may send the request signal directly to the resource supply module on behalf of the second peripheral module. In another set of embodiments however the first peripheral module sends the request signal to the second peripheral module so that the second peripheral module can request power and/or a clock signal from the resource supply module.

In a set of embodiments of the first aspect of the invention elements of the resource control system can themselves be shut down to conserve power. For example where provided the master module(s) and/or the resource supply module may be powered down in some circumstances. In a set of embodiments at least one master module is arranged to provide a resource, e.g. power, to a peripheral when the master module is in a low power state. The allows, for example, the whole device to go into a sleep state but keep a timer powered to wake the device up at a predetermined time. As the master module is in a low power state however it cannot respond to resource request signals and so cannot change the status of the resources being supplied.

Such an arrangement is novel and inventive in its own right and thus when viewed from a further aspect the invention provides a microcontroller device, one or more peripheral systems and one or more resource control modules for controlling the supply of resources to said peripherals in response to resource request signals, wherein the or at least one of the resource control modules has a low power state in which it is not responsive to resource request signals but in which it supplies a resource to at least one peripheral. Preferably the resource is power and/or a clock signal.

In accordance with all aspects of the invention the microcontroller device may be provided by a single integrated circuit.

In accordance with all aspects of the invention the microcontroller device may comprise or be arranged to control a radio transmitter and/or a radio receiver.

Certain embodiments of the invention will now be described, by way of example only, with reference to the accompanying drawings in which.

Figure 1:
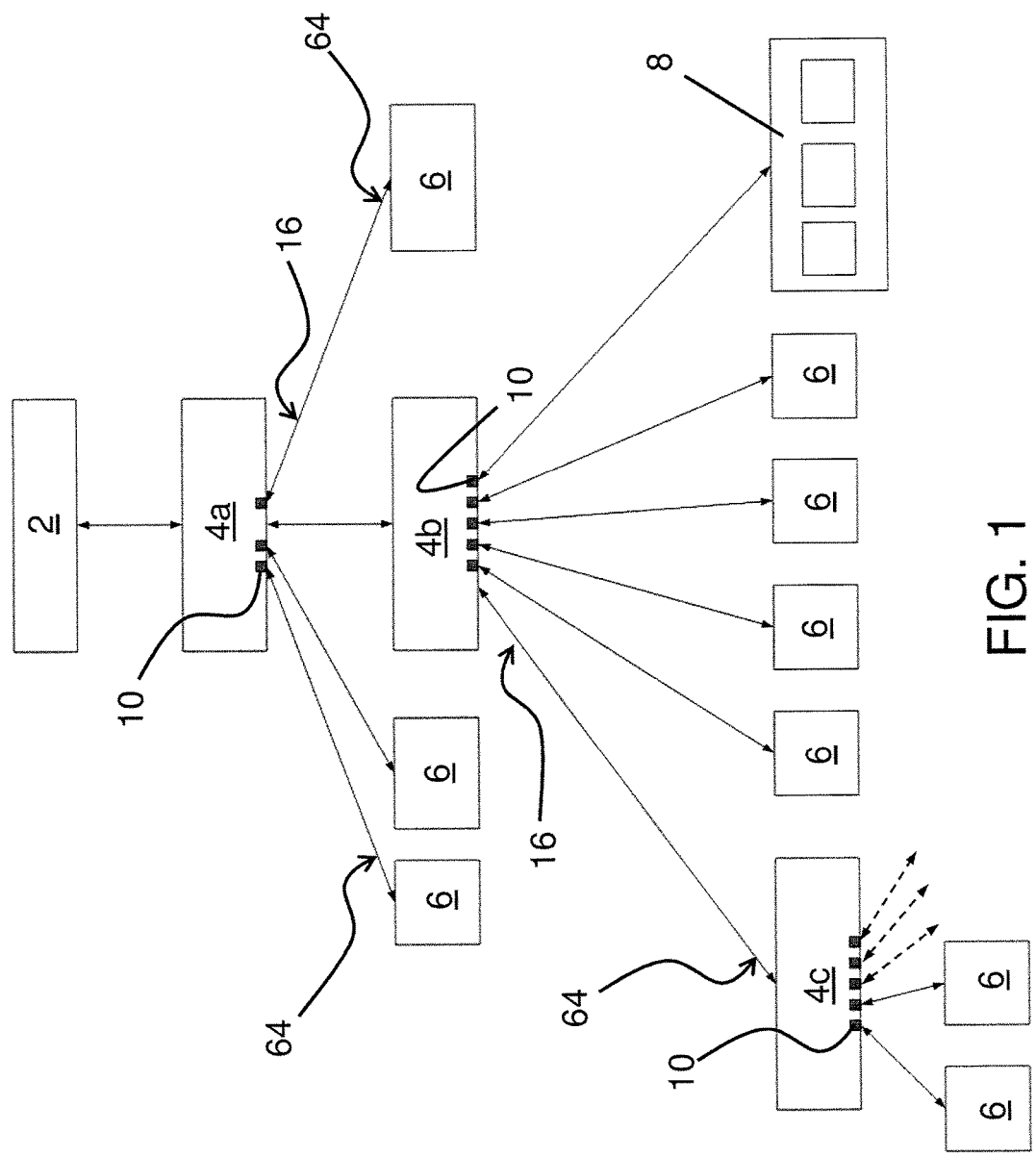
FIG. 1 is a schematic diagram of the architecture of a system in accordance with the invention.

FIG. 1 shows the overall architecture of a resource control system for a microcontroller in accordance with the invention. At the top of the architecture is a top support module 2. This contains the power and clock resources which the system controls, as will be described in greater detail later.

Below the top support 2 is a master module 4a. Again this will be described in greater detail later. Beneath the uppermost master module 4a is a further master module 4b and three slave modules 6. The slave modules 6 are associated with various peripheral modules, the precise nature of which is not essential. The mid-level master module 4b is in turn connected to five further slave modules 6, 8 (one of which is the main processor module 8) and a yet further master module 4c. The lowest-level master module 4c has two more slave modules 6 associated with it.

This high-level diagram illustrates that there is significant degree of flexibility in the possible hierarchies which can be implemented to suit the particular application. Clock line connections between a slave module 6 and a master module 4 are made via a clock gate control 10 whereas connections between one master module 4 and another are direct—i.e. do not include a clock gate control 10. Thus regardless of the hierarchy, for any given slave module 6 there is only a single clock gate control 10 in the clock line between it and the top support module 2.

Figure 2:
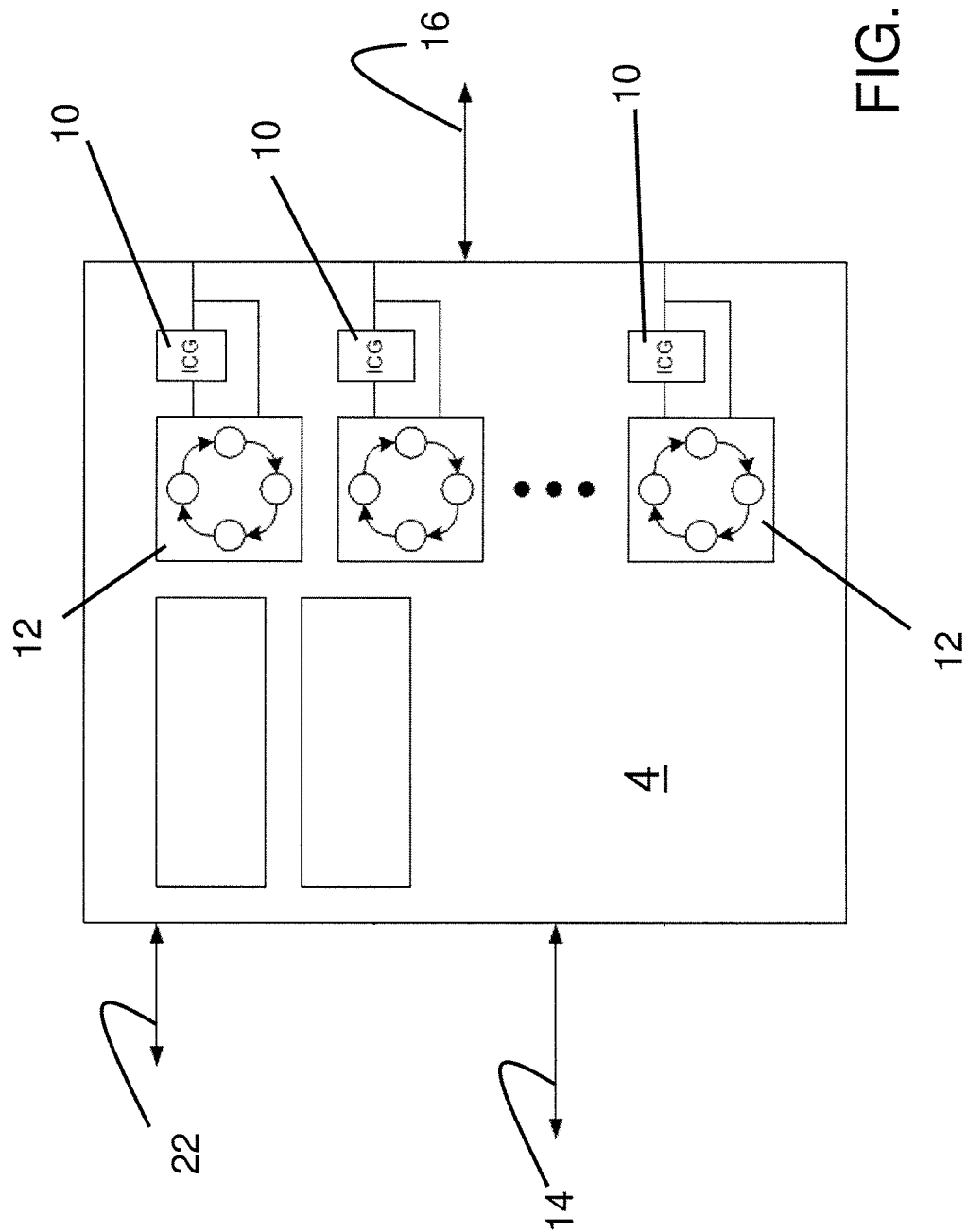
FIG. 2 is a schematic diagram of a master module for use in the system of FIG. 1.

FIG. 2 shows a schematic representation of a master module 4. The master module 4 is used to distribute the different clocks, main resets and status information to the slave modules or any other master modules connected to it. As mentioned above the slave modules are connected via respective clock gate controls 10 which are under the control of the master module by means of respective state machines 12 associated with each. It also controls the signals needed for power gating, generates reset, isolation and save/restore signals, and handles the different request signals from the slave modules. Some of these request signals may be handled internally in the master module 4, and some may be sent up to a higher master module and eventually to the top support module 2 in order for different oscillators, power regulators and buffers to be turned on and off as will be explained in greater detail below with reference to FIGS. 3 and 4.

The master module 4 has several inputs and outputs. The upper interface 14 is used to connect the master module 4 to another master module at a higher level, or to connect directly to the top support module 2 (see FIG. 1). The master module 4 sends out requests on this interface for different power regulators and clock sources and different power/ clock buffers, and the data returned are the corresponding different system clocks, different system reset signals and status signals for the power and the clocks.

The lower interfaces 16 (only one of which is shown) comprise a bus of several interfaces, one for each slave 6 that is connected to the master 4. If another master is connected as a slave to this master, the requests from that master are merged with requests from other slaves and passed directly to the upper interface 14 and the corresponding clocks and reset signals from the upper interface 14 are passed directly to the lower interface for the lower-level master without going through a clock gate control 10 or any other logic.

The interface 22 is a processor communication interface for configuration of the master and reading status information.

The master module also includes, integrated in the main interfaces between the masters and slaves 16, 64 and pairs of masters 14, 16, an input and output pair known as a 'buddy' connection. This comprises a communication line which allows a connection between two peripherals in order to allow one peripheral to stimulate another to request resources. The request is made through the buddy request output of the master module to which the slave module for the requesting peripheral is connected and is passed along to the buddy request input of the master module connected to the slave module for the peripheral for which the resources have been requested. The buddy request signal is then passed down to the second peripheral, via its slave module 6, which is prompted to make the appropriate request. This arrangement allows a reduction in latency when a peripheral initiates a task for which it knows it will require another peripheral to carry out an action for which it will require clock and and/or power resources.

Figure 3:
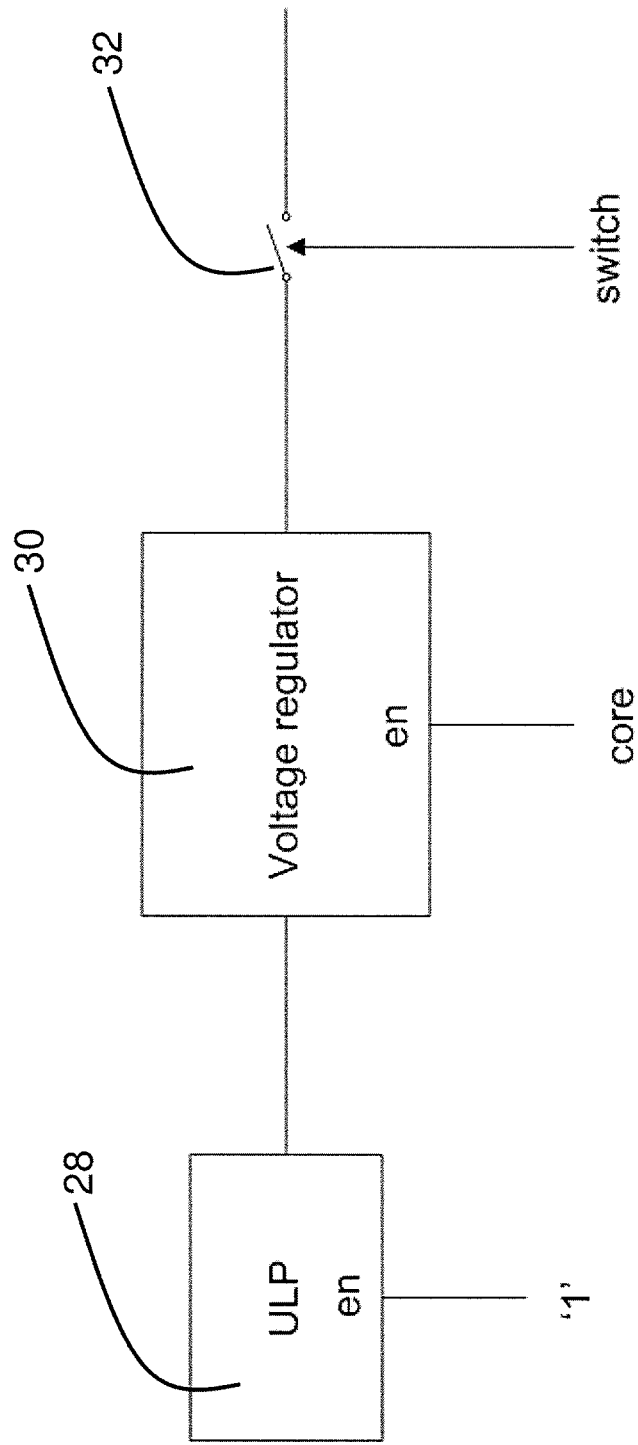
FIG. 3 is a diagram showing more detail of a power resource which may be controlled.

FIG. 3 shows schematically how the top support module 2 handles power requests from a master module on behalf of a slave. The power supply comprises an ultra low power (ULP) regulator 28 and a main voltage regulator 30. There is also a switch 32 which is used to connect or disconnect power to a particular peripheral.

The power request in this embodiment comprises two signals: core and switch. The core signal is used to request that the main voltage regulator 30 is turned on. For example if a master module receives a request from a slave module or aggregate requests from more than one slave module that will require the main regulator to be turned on, it will issue a core signal. If the main regulator 30 is not switched on, power will be supplied only by the ULP 28. This will generally be sufficient to run the device during a low power sleep mode of the device. The uppermost or 'top' master module 4a may aggregate requests from all modules—e.g. peripherals 6, the microprocessor 8 and even the top support module 2 and use these to determine automatically whether to switch a particular regulator in.

The switch signal is used actually to provide power to a particular peripheral by opening or closing the power switch 32 associated with it.

Figure 4:
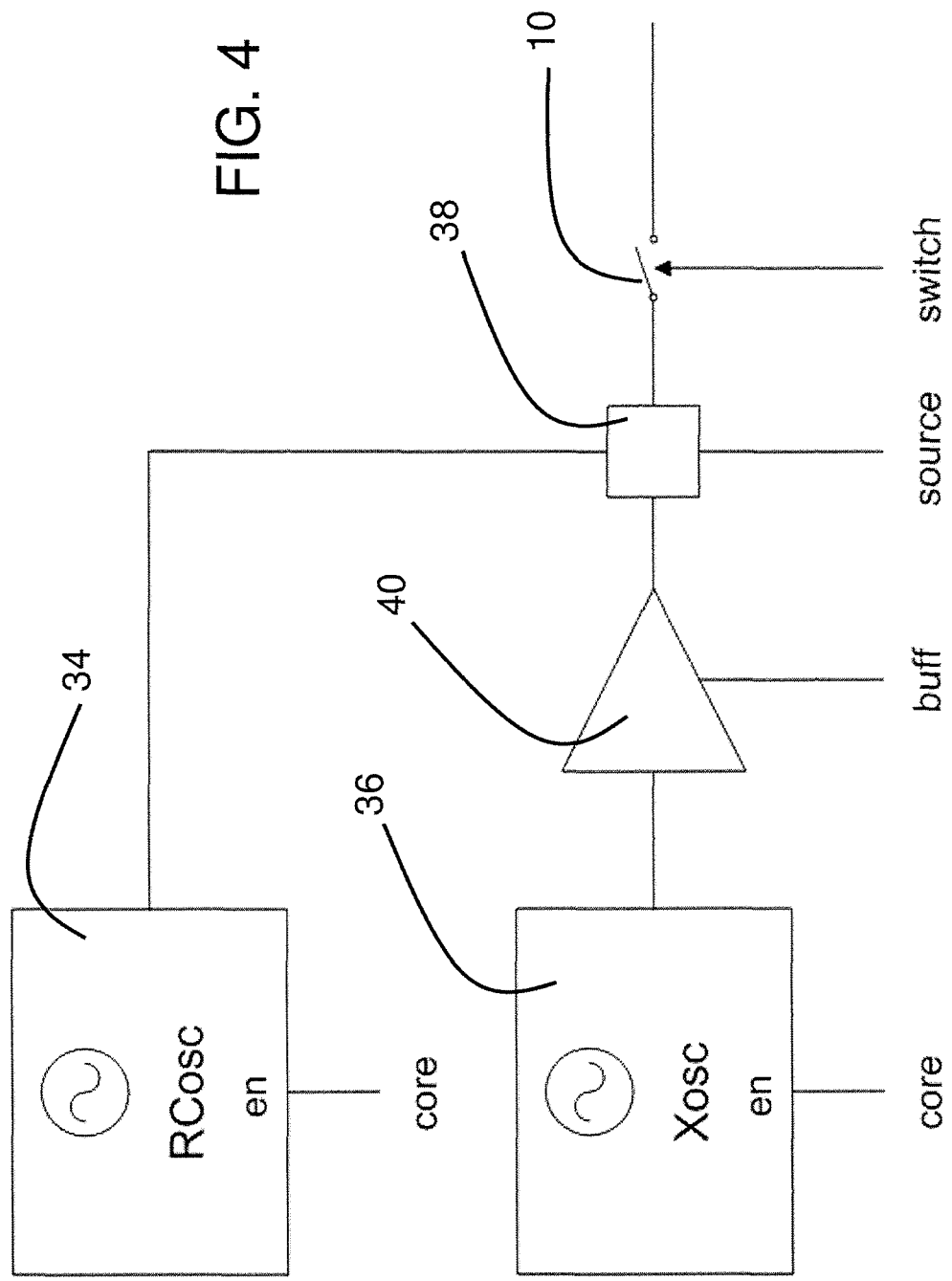
FIG. 4 is a diagram showing more detail of clock resources which may be controlled.

FIG. 4 shows schematically how the top support module 2 handles clock requests from a master module on behalf of a slave. The clock resource in this example comprises a higher power, very fast start-up low accuracy RC (resistor-capacitor) oscillator 34 and a lower power, slow start-up, higher accuracy crystal oscillator 36. The RC oscillator 34 is connected directly to a common clock source portion 38 but the crystal oscillator has a buffer 40 to amplify the signals it produces. The switch 10 shown is the clock gate control provided in the master module 4 and described above with reference to FIG. 2.

The clock request signals comprise three different constituent signals. The simplest is the switch signal which the master module 4 uses to close the clock gate 10 corresponding to the slave 6 from which the request came. The core signal is used to request that one or both of the oscillators 34, 36 is turned on. The core signal includes a parameter that determines which oscillator is being referred to. The third constituent signal is buff which allows the buffer 40 to be turned on.

As mentioned above, the RC oscillator 34 has a very fast start-up time. The lower inherent latency that this gives means that it can be powered down more readily when not required. The crystal oscillator 36 has a relatively long start-up time, but the buffer 40 has a shorter start-up time. This means that to reduce power but without introducing a long latency it is possible to power-down just the buffer but to keep the crystal oscillator running. When the crystal oscillator clock is required, the buffer can simply be powered up again which can be done much more quickly than if the crystal oscillator itself had to be powered up.

The arrangement described above gives a good degree of flexibility in how clock resources are supplied and in particular gives a range of options for trade-offs between accuracy and power consumption on one hand and also between latency and power consumption on the other hand. Similarly the ability to turn the main voltage regulator on and off gives a flexibility in the trade-off between latency and power consumption.

In this specific example there are four different penalty levels—that is four different standby states—which a peripheral can select, via its slave module, dependent on the specification of the peripheral (particularly with respect to maximum acceptable latency) and its operational status. The first, or highest, penalty level is where the main regulator 30 is off and clock sources 34, 36 are off. This of course has the lowest power consumption. In the next penalty level the main regulator 30 is on, but the clock sources 34, 36 are still off. Consequently the latency is a little lower as it is only necessary to power up the relevant clock source 34, 36 and not the regulator 30 as well. Of course it may well be that the regulator 20 is already powered in response to a request by another peripheral; thus the penalty level represents the maximum latency that the peripheral can tolerate, but in practice it may be shorter.

The third penalty level is with the regulator 30 and clock sources 34, 36 on but the buffer 40 turned off. This allows the clock provided by the crystal oscillator to be provided relatively quickly if required but saves on the power consumed by the buffer. The fourth penalty level is with the buffer 40 switched on and just the clock gate 10 open. This allows the either clock source 34, 36 to be provided straight-away but offers very little power saving over the situation where the clock is in fact being provided to the peripheral.

Figure 5:
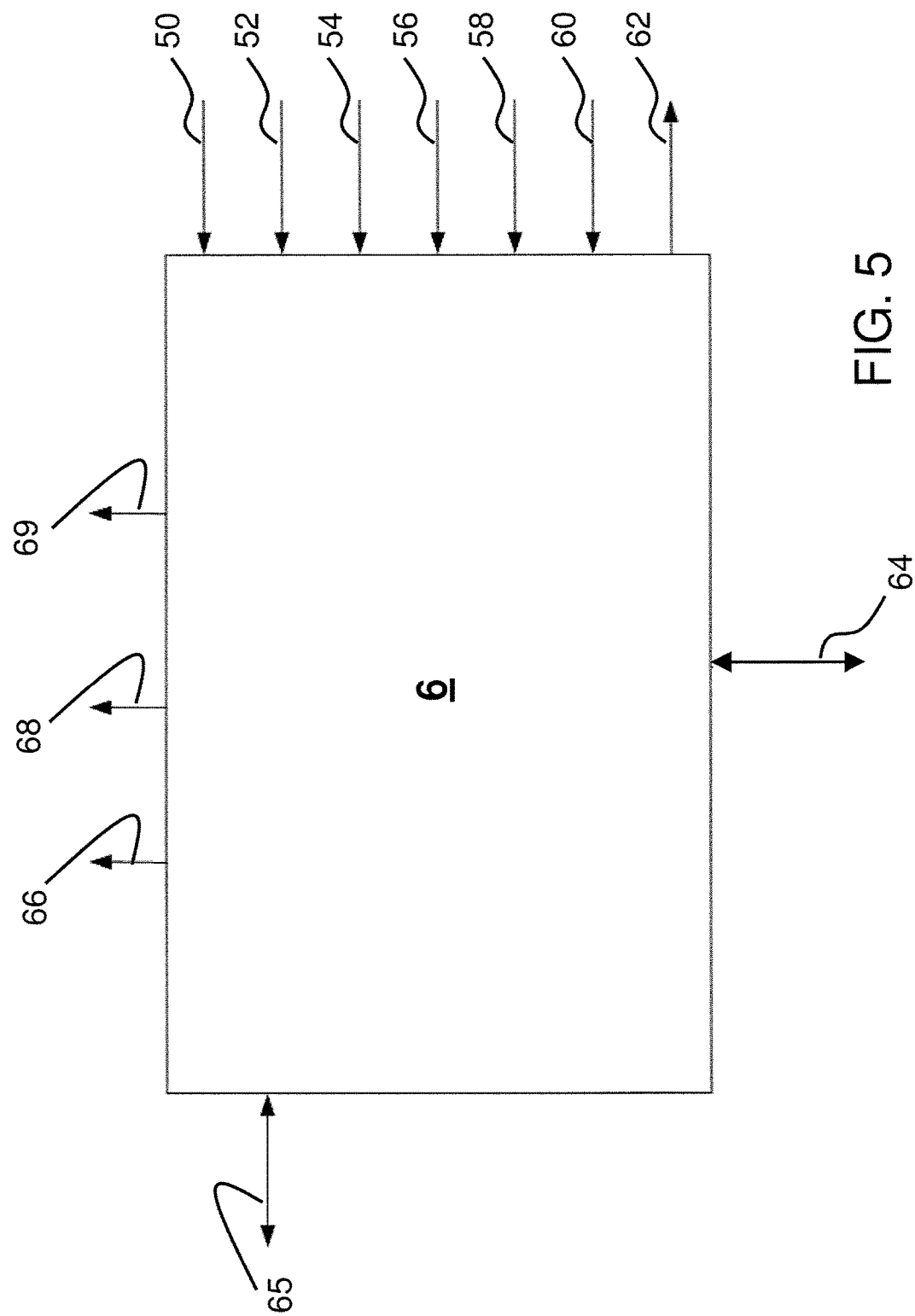
FIG. 5 is a schematic diagram of a slave module for use in the system of FIG. 1.

FIG. 5 is a schematic diagram of the slave module 6. At least one such slave module is provided in every peripheral. At the right hand side of FIG. 5 are a number of inputs from the peripheral to the slave module. These comprise: a resource request line 50 which can be used by the peripheral to request a specific pair of power and clock frequency (which is passed as a parameter of the request); an asynchronous resource request line 52, which allows an asynchronous event such as stimulation of a wake-up pin to request a clock/power pair; a reset request line 54 which allows the peripheral to request a reset; a penalty level setting 56, which allows the peripheral to determine the penalty level and thus the maximum latency which it can accept as discussed above; and a clock source input 58 which allows the slave to specify which clock source it would like to receive (as opposed to specifying just the frequency required as part of the clock/power pair request.

Also on the right hand side of FIG. 5 is the buddy request input 60 and the buddy request output 62. As explained previously, these allow the peripheral associated with the slave to give an early warning to another peripheral that it will need to request resources by sending an appropriate signal on the buddy request input. That is passed through the master module to which the slave 6 is connected, via the master module to which the target slave is connected, and down to the target slave module and to its equivalent of the buddy request output 62 to the target peripheral. This allows the peripheral to make the resource request prompted in the buddy request. This process can happen between any two peripherals and thus another peripheral can make a buddy request which is received by the slave module 6 and passed out through the buddy request output 62 to prompt the peripheral to make the appropriate resource request.

At the bottom of the representation in FIG. 5 is the interface connection 64 to the master module. This corresponds to the connection 16 on the master module as shown in FIG. 2. As with the master module, the slave module 6 also has a configuration interface 65 shown on the left hand side.

At the top of the block are three outputs: a clock output 66, which provides the requested clock to the peripheral; a reset output 68 allowing the slave module to pass a reset signal to the peripheral associated with the clock; and a status output 69 which provides status information about the power and clocks requested by the peripheral.

Figure 8:
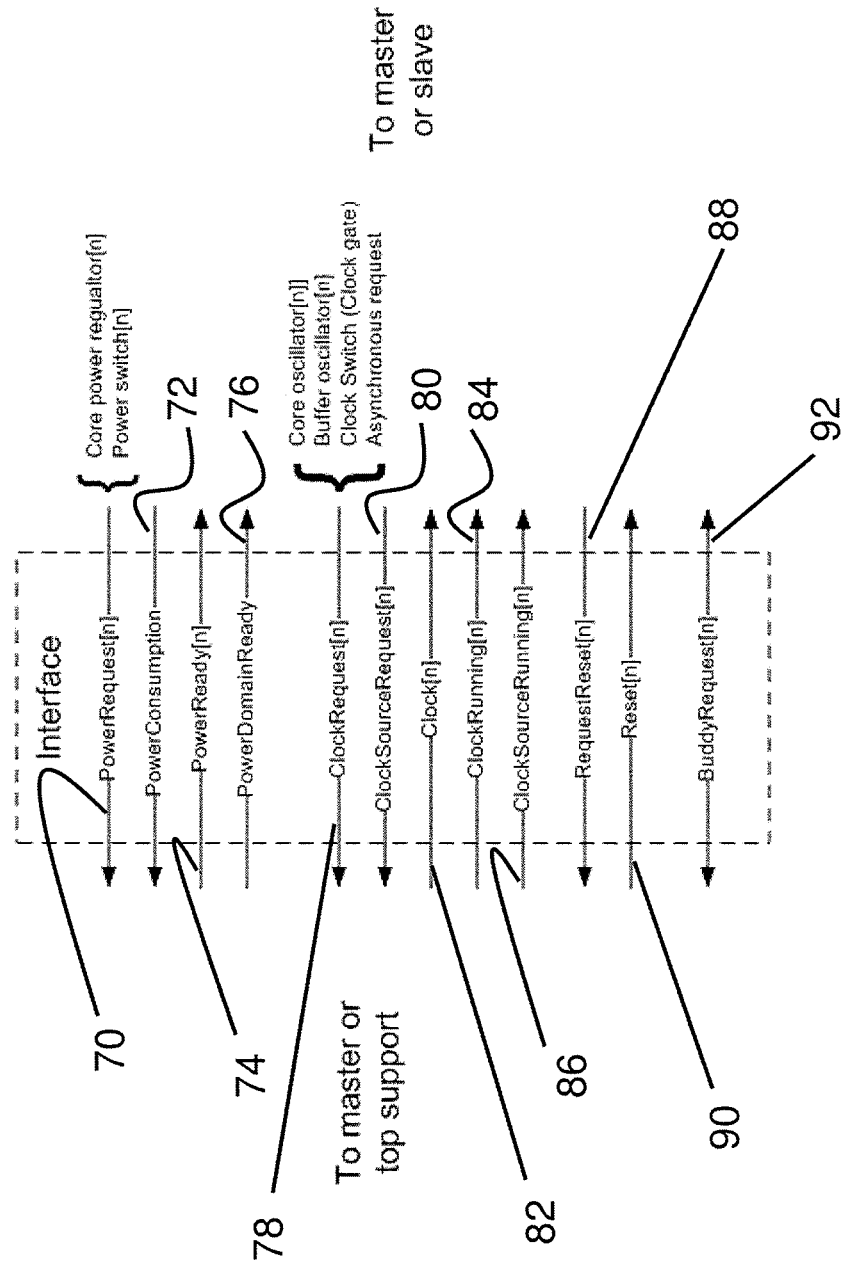
FIG. 8 gives an example constitution of the main interface between modules.

FIG. 8 shows an exemplary make-up of the interface 16, 64 either between a master module 4a, 4b, 4c and a slave module 6, between two master modules 4a, 4b, 4c or between the top master module 4a and the top support 2. The element higher in the hierarchy is on the left hand side and the element lower in the hierarchy is on the right hand side.

The four connections 70-76 shown uppermost in FIG. 8 relate to power, The first is the upstream PowerRequest 70 used for requesting power for a peripheral 6 as previously described. This may be connected e.g. to the core power regulator and the power switch e.g. of the peripheral module 6. The other upstream connection is PowerConsumption 72 used for indicating the actual power consumption of the peripheral. PowerReady 74 is a downstream connection used to indicate when the requested power source is ready to be supplied and PowerDomainReady is a downstream connection used to indicate that a power domain is ready if that has been requested.

The next five connections 78-86 relate to clocks. The ClockRequest upstream connection 78 may be connected to the core oscillator, buffer oscillator, clock switch (or clock gate) and asynchronous request functions of the peripheral module 6. The upstream ClockRequest 78 and ClockSource request 80 have been described previously. Downstream connection 82 is the actual clock signal whilst the other two downstream connections 84, 86 indicate that the clock and the clock source respectively are running.

The RequestReset connection 88 allows the peripheral to request a reset signal as mentioned before. The Reset downstream connection 90 allows a reset signal to be provided if appropriate.

Finally, as described above, the BuddyRequest 92 is a two-way connection between modules that allows one to request resources in anticipation of their being required by another, Some exemplary operations of the embodiment described above will now be described with reference to all of the Figures.

First is it assumed that a peripheral requires power and a clock source in order to wake up from a sleep mode. This could be for example a peripheral associated with a slave module 6 connected to the intermediate level master module 4b (see FIG. 1). The peripheral passes a request for the appropriate power (say the main regulator 30) and the appropriate clock source (say the crystal oscillator 36) by means of the asynchronous resource request input 52 and the clockSource input 58? to the slave module 6 associated with the peripheral. The slave module 6 passes this request to the master module 4b by means of the slave-master interface 64, 16. The state machine 12 associated with the requesting slave 6 processes the resource request. For example if the requested clock source is already being provided to another peripheral the state machine will simply cause the clock gate 10 associated with the slave 6 to open, thereby providing the clock to the new peripheral by means of the master-slave interface 16, 64. Similarly power may be provided immediately if it is already available.

Regardless of whether the required clock/power pair is already being provided, the resource request is passed from the receiving master module 4b up to the next-level master module 4a by means of the master-master interface 14, 16. The receiving master module 4a passes the request directly through, via its output 14, to the top support module 2. The top support module 2 then powers up the main voltage regulator 30 and the buffer 40 associated with the crystal oscillator 36. The oscillator itself is already running since in this example one of the peripherals (which may or may not be the peripheral requesting the clock) had a penalty level of three set by means of the penalty level input 56 to its slave module 6. This was to enable a low latency delivery of the crystal clock source 36 without having to power up and stabilise the crystal itself by shutting down only the buffer 40.

The crystal oscillator clock is provided to the common clock source portion 38 and from there back down to the requesting master module 4b via the interface 14 between the top support module 2 and the upper-level master module 4a and via the interface between the upper and intermediate-level master modules 16, 14. The state machine 12 of the requesting master module 4b which is associated with the requesting peripheral determines when the clock and power sources have stabilised and then opens the power switch 32 and the clock gate 10 to provide the clock and power to the requesting peripheral via its slave module 6.

If the power and/or clock were able to be provided straightaway by the master module 4b because they were already running, passing up the request to the top support 2 ensures that they will continue to be provided for as long as they are required by the requesting peripheral, regardless of whether the peripheral that had originally requested the resource stops requesting it.

In another exemplary operation a peripheral is executing a task for which another peripheral will be required. For example the main processor may need to write to flash memory and thus the flash peripheral will need to be powered and have a clock source. Possibly in addition to its own request for resources—or separately if, for example, it is already running—the main processor sends a buddy request destined for the flash memory peripheral by means of the buddy request input 60 of the slave module 8 associated with the main processor. The buddy request signal is passed up to the master module 4b connected to the slave 8 by means of the ordinary slave-master interface 64, 16 which then passes it out to the master module 4c which is connected to the flash memory peripheral via the interface 14, 16 between the respective master modules. The receiving master module 4c then passes the request down to the slave 6 associated with the flash memory peripheral by means of the master-slave interface 16, 64 and the peripheral then responds to the request by making a resource request in the way described previously.

By using the buddy request system, the resources required by the flash memory peripheral can be supplied without significant additional latency. For example the flash memory peripheral may be ready to respond when contacted by the main processor without having to wait for the flash memory peripheral to wake up first. It will be appreciated of course that such a system could be used between any two peripherals—those mentioned above are merely examples.

In another exemplary operation, some or all of the master modules 4 themselves may be powered down but such that some of the slave modules 6 connected to them continue to receive power and clock resources while the master module is asleep. A peripheral might, for example, receive power from the ULP regulator 28 and the low power crystal oscillator 36 to allow it to operate in a low power mode. While the master module 4 is powered down it clearly cannot process any new requests from the slave module 6 but rather the requests from the slaves may be 'latched' when the master module 4 is powered down. The ability to power down the master modules 4 clearly gives even greater scope to save power during certain operations.

Figure 6:
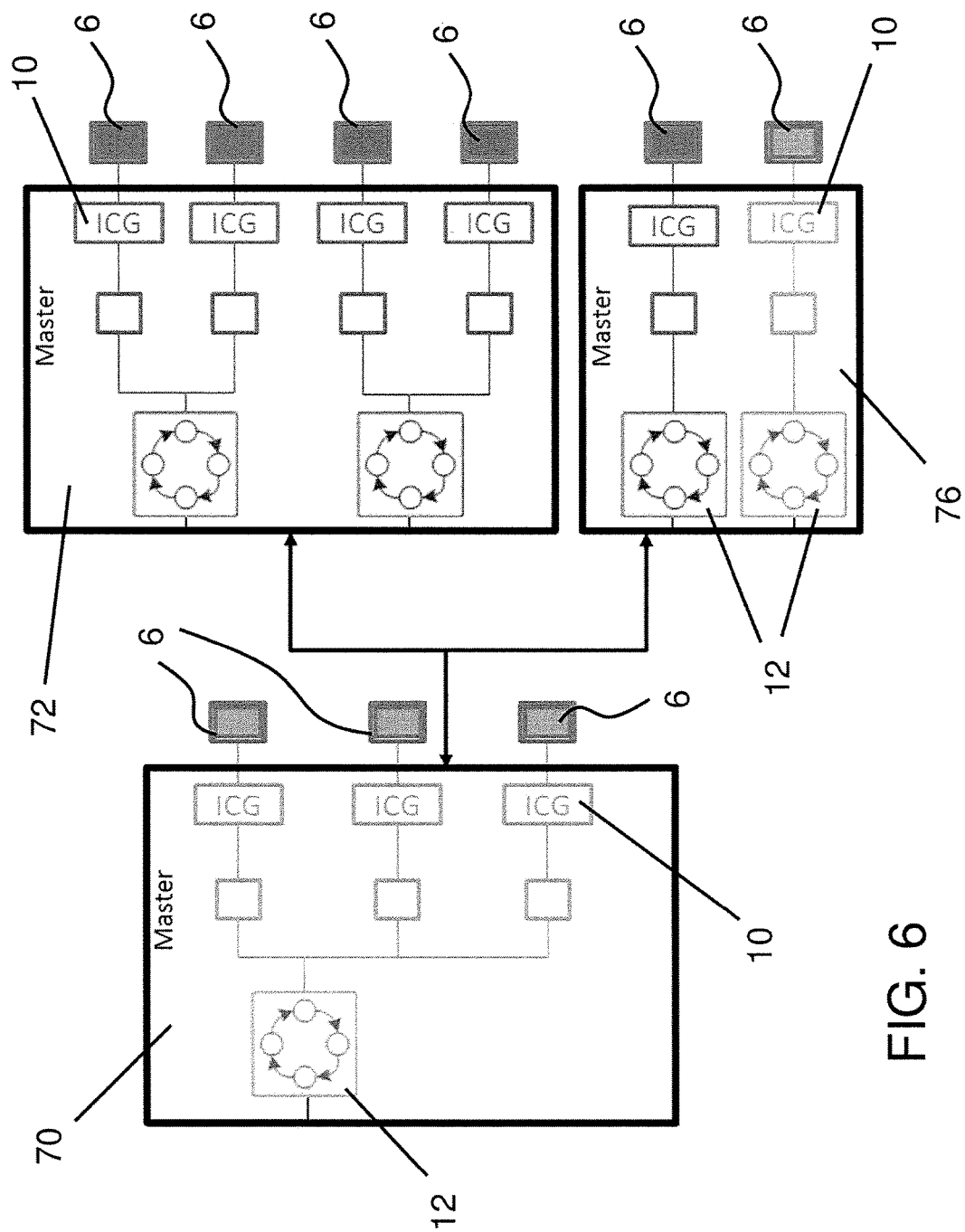
FIGS. 6 and 7 show possible alternative arrangements of control between the master and slave modules.

FIG. 6 shows schematically the arrangement of three master modules 70, 72, 74 in accordance with another embodiment of the invention. In particular there is a higher-level master 70, to which the two lower-level masters 72, 74 are connected. In contrast to the embodiment described above in which a state machine 12 is associated with each clock gate 10 (and therefore each peripheral 6), in this embodiment some of the peripherals are grouped into power domains which within each master module are served by a common state machine 12 controlling all the signals for that power domain. Power domains correspond to groups of peripherals which are connected to the same power regulator through the same power switch. It is not possible to turn the different peripherals on and of independently but each peripheral still has a clock gate 10 associated with it and thus the provision of a clock may still be controlled at the individual peripheral level.

Thus in the top level master module 70, all three peripherals belong to the same power domain and so the master module 70 has only one state machine 12. In one of the lower-level master modules 72, there are two power domains, each having two peripherals 6. One of these power domains could be the same as the one associated with the higher-level master module or they could both be different. In the other lower-level master module 74 there are also two power domains and therefore two state machines 12, but in this case each power domain only has a single peripheral 6 associated with it.

Although arranging the peripherals into power domains is slightly less flexible than allowing each to have control over its power, there is a significant advantage in reducing the number of state machines 12 as this reduces the number of gates required on the integrated circuit and so the overall power consumption and area needed.

Figure 7:
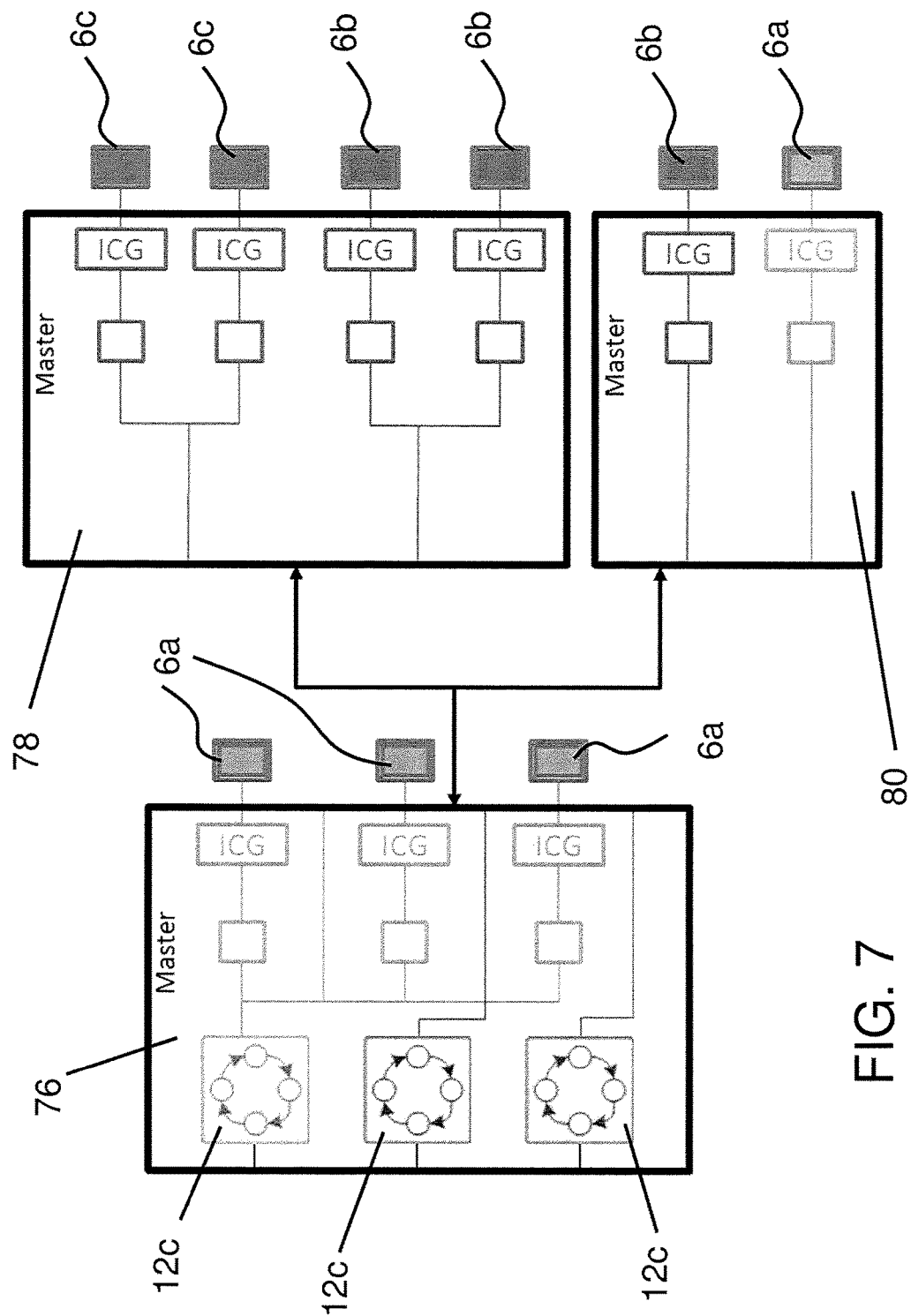

FIG. 7 shows schematically another embodiment which takes this principle even further. In this arrangement there are three power domains and just one state machine 12a, 12b, 12c associated with each one. The state machines 12a, 12b, 12c are all located in the higher-level master module 76—i.e. the two lower-level master modules 78, 80 connected to it do not have any state machines. The state machines 12a, 12b, 12c handle all the requests from the peripherals 6a, 6b 6c in their respective power domains by means of the ordinary master-master interfaces.

In this example all three peripherals 6a connected to the top master module 76 and one of the peripherals 6a connected to one of the lower-level master modules 80 form the first power domain controlled by the first state machine 12a. The second power domain controlled by the second state machine 12b comprises two peripherals 6b connected to one of the lower-level master modules 78 and one peripheral 6b connected to the other lower-level master module 80. The third power domain controlled by the third state machine 12c comprises just two peripherals 6c connected to one of the lower-level master modules 78.

The code for the master modules 76, 78, 80 can be the same with one of them 76 simply being designated as the top master module by a configuration setting, to allow it to take control of the state machines. The top master module 76 will also be the one in contact with the top support module.

It will be seen that the embodiments of the invention described above give greater control and flexibility over the provision of clock and power resources to peripheral systems and thus allow for significant power savings. Moreover the arrangements allow for a modular approach which means that the peripherals can easily be added, modified or removed without upsetting the resource control scheme or requiring extensive re-coding. It will be appreciated however by those skilled in the art that the embodiments described are merely examples and that the principles set out herein could be used in a wide variety of configurations and thus that the scope of the invention is not limited to the examples given.

The invention claimed is:

1. A microcontroller device comprising:
   at least one processor;
   one or more peripheral systems connected to at least one slave module; and
   a resource supply module;
   wherein the processor and peripheral system(s) are each arranged to generate a signal when they require power and/or a clock signal and wherein said signals stimulate the resource supply module to supply the requested resource;
   wherein the device further comprises two master modules each connected to one or more slave modules, a first of the master modules being connected to the resource supply module, and a second of the master modules being connected to the first master module such that request signals from peripherals connected to the second master module are passed to the first master module via a master-master interface;
   wherein at least one master module comprises a gate for each slave module to which it is connected to allow the selective passage of a clock signal to the respective slave module; and
   wherein the at least one master module is arranged, on receipt of a request for a clock signal, to ensure that the appropriate clock source is stable and running before opening the clock gate to the slave module which made the request.

2. A device as claimed in claim 1 wherein at least one master module is connected to a plurality of slave modules.

3. A device as claimed in claim 1 wherein the at least one master module is arranged to issue a request to the resource supply module even if the requested clock, or another, more accurate clock is already being provided.

4. A device as claimed in claim 1 wherein one or more further master modules are connected to the first master module.

5. A device as claimed in claim 4 wherein the first master module is arranged to determine automatically which of a plurality of power regulators is to be used.

6. A device as claimed in claim 1 wherein the first master module is connected to the second master module such that the first master module has a direct, through-connection to an upstream output of the second master module.

7. A device as claimed in claim 1 wherein the resource request signals comprise a request for power and a request for a particular clock signal.

8. A device as claimed in claim 1 wherein the resource request signals comprise a request for power which includes the level of power required.

9. A device as claimed in claim 1 wherein the resource request signals comprise a request for a clock signal which indicates the quality, or minimum quality, of clock that is required.

10. A device as claimed in claim 1 wherein the resource request signals comprise a request that a particular clock source is to be turned on.

11. A device as claimed in claim 1 wherein the resource request signals comprise a request that a clock buffer is turned on.

12. A device as claimed in claim 1 comprising a plurality of predetermined options which the slave modules are able to select for determining to what extent resources are made available to the slave module.

13. A device as claimed in claim 12 wherein the predetermined options comprise differing latencies and differing power consumptions.

14. A device as claimed in claim 1 wherein elements of the resource control system can themselves be shut down to conserve power.

15. A device as claimed in claim 1 wherein at least one master module is arranged to provide a resource to a peripheral when the master module is in a low power state.

16. A device as claimed in claim 1 comprising at least one first peripheral arranged to stimulate a second peripheral to issue a resource request.

17. A device as claimed in claim 1 provided by a single integrated circuit.

18. A device as claimed in claim 1 comprising, or arranged to control, a radio transmitter and/or a radio receiver.

19. A microcontroller device comprising:
at least one processor;
one or more peripheral systems connected to at least one slave module; and
a resource supply module;
wherein the processor and peripheral system(s) are each arranged to generate a signal when they require power and/or a clock signal and wherein said signals stimulate the resource supply module to supply the requested resource;
wherein the device further comprises two master modules each connected to one or more slave modules, a first of the master modules being connected to the resource supply module, and a second of the master modules being connected to the first master module such that request signals from peripherals connected to the second master module are passed to the first master module via a master-master interface;
wherein the device comprises a plurality of predetermined options which the slave modules are able to select for determining to what extent resources are made available to the slave module, wherein the predetermined options comprise differing latencies and differing power consumptions.

20. A microcontroller device comprising:
at least one processor;
one or more peripheral systems connected to at least one slave module; and
one or more resource control modules for controlling the supply of resources to said peripherals in response to resource request signals, wherein the or at least one of the resource control modules has a low power state in which it is not responsive to resource request signals but in which it supplies a resource to at least one peripheral;
wherein the processor and peripheral system(s) are each arranged to generate a signal when they require power and/or a clock signal and wherein said signals stimulate the resource control module to supply the requested resource;
wherein the device further comprises two master modules each connected to one or more slave modules, a first of the master modules being connected to the resource control module, and a second of the master modules being connected to the first master module such that request signals from peripherals connected to the second master module are passed to the first master module via a master-master interface;
wherein at least one master module comprises a gate for each slave module to which it is connected to allow the selective passage of a clock signal to the respective slave module; and
wherein the at least one master module is arranged, on receipt of a request for a clock signal, to ensure that the appropriate clock source is stable and running before opening the clock gate to the slave module which made the request.

21. A device as claimed in claim 20 wherein said resource is power and/or a clock signal.

* * * * *